UNITED STATES PATENT OFFICE.

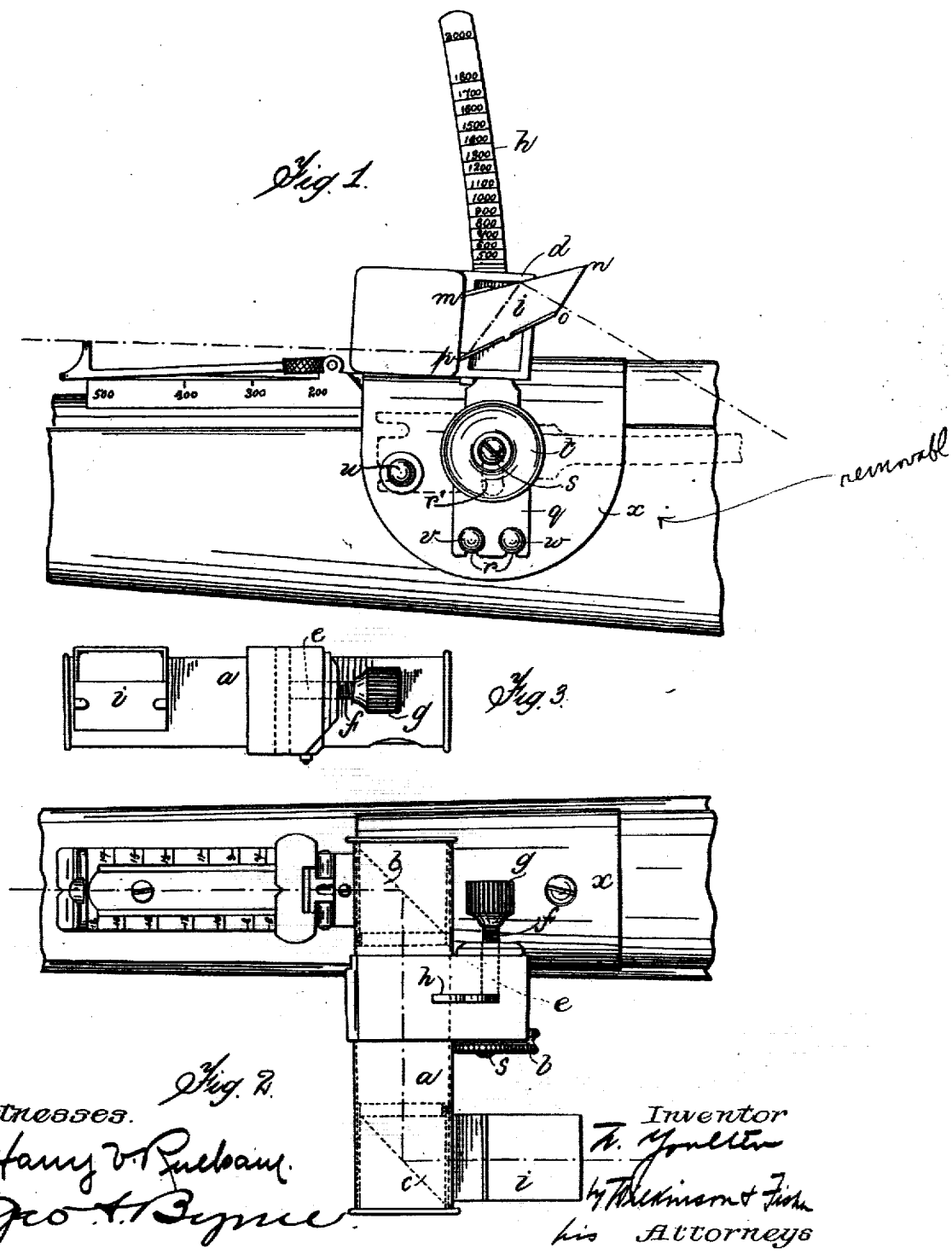

WILLIAM YOULTEN, OF WESTMINSTER, ENGLAND.

INSTRUMENT FOR SIGHTING GUNS FROM COVER.

No. 825,169.      Specification of Letters Patent.      Patented July 3, 1906.

Application filed July 10, 1905. Serial No. 268,993.

*To all whom it may concern:*

Be it known that I, WILLIAM YOULTEN, a subject of the King of England, residing at 159 Victoria street, Westminster, in the county of London, England, have invented certain new and useful Improvements in Instruments for Sighting Guns from Cover; and I do hereby declare the following to be a full, clear, and exact description of the invention, such as will enable others skilled in the art to which it appertains to make and use the same.

This invention relates to further improvements on instruments for sighting guns from cover, which instruments are now generally known by the name of "hyposcopes" and for which Letters Patent have been granted to me, No. 694,904.

According to my present invention I dispense with or greatly reduce in length the vertical tube carrying the mirror or prism coming in front of the gunner's eye, and I so arrange the mirrors or prisms that the first of the series may come, as with the previous instrument, behind or in place of the back sight of the rifle or other gun, while the last of the series of mirrors or prisms is so placed that the emergent rays are deflected downward to a suitable position for entering the gunner's eye.

In some cases the instrument may consist of a single tube which is mounted horizontally behind the back sight, carrying one prism or reflector (coming immediately behind such sight) from which the field of view is reflected by suitable mirrors or prisms to the other end of the tube, where the last mirror or prism is so placed that it deflects the said view downward in a slanting direction to the eye of the gunner.

I attach to the rifle a bar or stem which may be adjustable and capable of revolution round about a pivot, so that it can be turned down out of the way when not in use. When in use, the said stem or bar is turned upward and fixed approximately at right angles to the barrel, and upon the said stem or bar, which may be graduated to denote elevations, the said horizontal tube or reflecting instrument slides and may be set to any elevation required. The stem or bar may be suitably bent or curved to cause the reflecting instrument to tilt over as it rises in order to keep the said instrument in the proper position with respect to the line of aim, and in order that this invention may be better understood I will now proceed to describe the same with reference to the drawings accompanying this specification, which show one form of my improved hyposcope as applied to a rifle.

Figure 1 is a side elevation of a portion of a rifle with my improved hyposcope attached thereto. Fig. 2 is a plan of same. Fig. 3 is a front elevation of the hyposcope detached from the rifle.

The same letters of reference are employed to denote the same parts in all the views.

$a$ shows the main horizontal tube of the hyposcope provided with prisms at $b$ and $c$. These prisms are mounted in such a way that they can be slid into and out of each end of the tube $a$, so that when the instrument is not in use they can be turned in such a way that the prisms are protected by the tube $a$.

$d$ is a bracket-piece attached to the horizontal tube $a$ and provided with a slot at $e$.

$f$ is a screw provided with a milled head $g$, by means of which the screw $f$ may be turned and made to project into the slot $e$ to fix the hyposcope at any required position on the stem $h$. At the other end of the tube $a$ and opposite the prism $c$ is placed a short chamber or tube $i$, provided with two reflecting-surfaces $m$ $n$ and $o$ $p$. In the instrument shown in the drawings the reflecting-surfaces are formed by means of a prismatic piece of the shape shown in the drawings and bounded in Fig. 1 by lines $m$ $n$, $n$ $o$, $o$ $p$, and $p$ $m$.

Referring to the stem $h$, this is provided in the form shown at Fig. 1 with an extension $q$ and with slots $r$ $r'$.

$s$ is a screw-pin passing through the slot $r'$ and provided with a milled head $t$.

$u$, $v$, and $w$ are pins which may be fastened on the rifle or, as in the case of the instrument shown on the drawings, the whole arrangement can be removed from the rifle, being mounted on a hand-guard $x$, which clips over the rifle and can be immediately placed in position or removed.

The stem, which is shown in full lines raised at Fig. 1, may be lowered into the position shown dotted when the hyposcope is removed by loosening the milled head $t$, sliding the stem upward on the screw-pin $s$, turning the stem $h$ down parallel to the rifle, adjusting it so as to engage with the pin $u$, and tightening the milled head $t$.

It will be observed that the stem *h* in the form shown in the drawings is not straight, but curved slightly, the object of this being that as the hyposcope is raised and depressed it is kept in the proper position for sighting. Suitable graduations indicating the ranges are marked on the stem *h*.

I do not wish to confine myself to the particular form of instrument shown on the drawings and herein described, as the particular form of the hyposcope may be varied, while retaining the principle of an additional reflecting surface or surfaces so placed as to reflect the image of the object aimed at diagonally downward from the horizontal tube of the hyposcope to the gunner's eye.

In the case of a machine-gun, the horizontal tube may be replaced by a box containing suitable mirrors or reflectors so placed that the emergent rays may be reflected diagonally downward to the gunner's eye, such box sliding on a suitably-curved stem, as in the case of the instrument already described.

Instruments constructed according to this invention are lighter than that described and shown in the specification and drawings accompanying my former Letters Patent, and lightness is a very important desideratum, especially in the case of a rifle-hyposcope. The instrument may also be made more cheaply than that previously described.

What I claim, and desire to secure by Letters Patent of the United States of America, is—

1. In an apparatus of the character described, the combination with a rifle, of a curved graduated sighting-arm connected thereto, of a horizontally-disposed tube mounted to slide vertically upon said sighting-arm, means for clamping said tube at the desired position, prisms carried by said tube, and means for reflecting the light emerging from the last of said prisms at an inclination downward, substantially as described.

2. In an apparatus of the character described, the combination with the firearm, of a curved graduated arm secured thereto, a horizontal tube carrying prisms adjustably mounted on said arm, one of said prisms being adapted to receive the light from the front side of the firearm and to reflect the same along the axis of said tube, and the other prism being adapted to throw the light rearward, with means for reflecting the light at an angle downward after it emerges from the second prism, substantially as described.

In testimony whereof I affix my signature in presence of two witnesses.

WILLIAM YOULTEN.

Witnesses:
A. E. VIDAL,
H. D. JAMISON.